US008522951B2

(12) United States Patent
Gonzalez Alemany et al.

(10) Patent No.: US 8,522,951 B2
(45) Date of Patent: Sep. 3, 2013

(54) MOVING WALKWAY

(75) Inventors: Miguel Angel Gonzalez Alemany, Oviedo (ES); Alberto Pello Garcia, Piedras Blancas (ES)

(73) Assignee: Thyssenkrupp Elevator Innovation Centre, S.A., Gijon, Asturias (ES)

( * ) Notice: Subject to any disclaimer, the term of this patent is extended or adjusted under 35 U.S.C. 154(b) by 0 days.

(21) Appl. No.: 13/541,340

(22) Filed: Jul. 3, 2012

(65) Prior Publication Data

US 2013/0015038 A1 Jan. 17, 2013

(30) Foreign Application Priority Data

Jul. 11, 2011 (ES) .................................. 201131168

(51) Int. Cl.
*B65G 21/00* (2006.01)

(52) U.S. Cl.
USPC .......................................... 198/330; 198/835

(58) Field of Classification Search
USPC ................. 198/321, 326, 330, 832, 833, 835
See application file for complete search history.

(56) References Cited

U.S. PATENT DOCUMENTS

| | | | | |
|---|---|---|---|---|
| 5,228,604 | A | 7/1993 | Zanini et al. | |
| 5,816,456 | A | 10/1998 | Graffin | |
| 7,341,139 | B2 | 3/2008 | Aulanko et al. | |
| 7,353,932 | B2 * | 4/2008 | Aulanko et al. | 198/330 |
| 7,370,748 | B2 * | 5/2008 | Mustalahti et al. | 198/321 |
| 7,665,595 | B2 * | 2/2010 | Matheisl et al. | 198/330 |
| 2003/0132087 | A1 * | 7/2003 | Inoue | 198/814 |
| 2005/0279610 | A1 * | 12/2005 | Ossendorf | 198/321 |
| 2008/0053788 | A1 * | 3/2008 | Ishikawa et al. | 198/330 |

FOREIGN PATENT DOCUMENTS

| | | |
|---|---|---|
| ES | 2 320 063 | 5/2009 |
| ES | 2 342 532 | 7/2010 |
| WO | WO 2005/042392 | 5/2005 |
| WO | WO 2005/042396 | 5/2005 |

* cited by examiner

*Primary Examiner* — James R Bidwell
(74) *Attorney, Agent, or Firm* — Merchant & Gould P.C.

(57) ABSTRACT

A moving walkway including a band (1) of pallets (2) moveable on side guides (4-5) and a drive mechanism formed by a pair of drive wheels (6) having a common shaft (7). The wheels have free-rotating peripheral rollers (9) engaging with formations (15) of the pallets (2) on their inner surface.

6 Claims, 6 Drawing Sheets

MOVING WALKWAY

This application claims benefit of Serial No. 201131168, filed 11 Jul. 2011 in Spain and which application is incorporated herein by reference. To the extent appropriate, a claim of priority is made to the above disclosed application.

FIELD OF THE INVENTION

The present invention relates to a moving walkway of the type used for transporting people and goods and which is made up of an endless band of pallets which move on side guides.

Conventional moving walkways for the indicated purpose are formed by a band of pallets which move on side guides, which pallets are secured and fitted on a structure supporting the weight of the components and users. The walkways are further provided with a glass or opaque balustrade which is also secured to the same support structure and on which a handrail moves at the same speed as the pallets, all by means of a drive mechanism.

The pallets have rollers which move on the side guides and drive the band of pallets along a forward movement section, a return section and intermediate overturning sections. The drive mechanism includes at least one pair of drive wheels having a common shaft around which one of the overturning sections of the band of pallets runs.

BACKGROUND OF THE INVENTION

Conventional systems for transporting passengers/goods such as moving walkways include a band of conveyor pallets which move in a track for the purpose of providing a continuous movement along a specific path. The conveyor pallets are connected to said chain track which moves as a result of a drive system. The drive system normally consists of a chain of conveyor plates, cogged wheels, a shaft and an electric geared motor. The electric motor drives the shaft to which there are integrally attached cogged wheels, which transmit the movement to the links of the chain of conveyor pallets. The conveyor pallets move in the same manner as said chain. The drive system is located at one of the ends of the moving walkway whereas the elements responsible for tensing the system are normally located at the opposite end. The turnover of the conveyor pallets which travel the entire moving walkway in the lower part completing the return trip occurs at these end areas of the moving walkway.

A series of new designs aiming to reduce the maximum machine height has emerged in recent years; the conventional drive system must therefore be modified.

There are several solutions which were chosen according to the walkway concept being used. One of these solutions is described in WO 05042392 from Kone Corporation, according to which the drive system is at least partially located inside the balustrade which is made possible by means of using a flat motor. The drive thus occurs by means of a series of belts or chains which finally drive the chain of pallets which has a short pitch to enable turning over in the small available space, but it otherwise works as a conventional walkway chain.

U.S. Pat. No. 7,341,139 also from Kone Corporation describes the drive of a handrail and its attachment to the pallets drive and motor system. U.S. Pat. No. 7,353,932 from Kone Corporation describes the arrangement of a band of pallets and the possible simultaneous use of two drive motors.

ThyssenKrupp's Spanish patent with application number 200601651 describes a compact walkway based on the concept of a band formed by pallets having a pitch shorter than the conventional ones. This walkway comprises a drive system moving the pallets of a moving walkway through drive chains which directly engage the lower part of the drive link chains. The drive chain has separate drive rollers which are made of deformable and elastic materials. The links of the drive chains are connected to one another by attachment shafts and have teeth and jaws in the lower part to engage the drive chain and the rollers.

ThyssenKrupp's Spanish patent with application number 2009311290 proposes a drive system for driving chainless escalators and moving walkways by means of using a set of roller wheels integral with shafts assembled between the departing and returning sections of the band of steps or pallets and engaging either the steps or pallets directly through engaging formations of said steps or pallets on their inner surface or similar formations present in a chain integral with the band of pallets or steps.

All these applications have the drawback of the limitation of power which can be transmitted by the drives to the band of steps or pallets due to the small available space in comparison with conventional drives, hindering the use of several transmission elements and the suitable reinforcement thereof.

In terms of escalators, most drive systems are still based on the conventional engagement method between a cogged wheel and a roller chain attached to the steps.

SUMMARY OF THE INVENTION

The present invention relates to a moving walkway of the type described above including a drive system which entails a modification in the conventional concept for driving escalators and moving walkways.

The object of the invention is to provide a drive system for moving walkways which do not have a chain of pallets, therefore lubricating the band of pallets or the drive thereof is not necessary and by reducing the space necessary with respect to a conventional drive, it allows transmitting a power level that is similar and in any case greater than those of the conventional compact drive systems.

The moving walkway of the invention comprises a band of pallets describing a forward movement section, a return section and intermediate overturning sections and a drive system formed by two drive wheels having a common shaft, around which one of the overturning sections of the band of pallets runs.

The drive wheels in the drive system of the moving walkway of the invention have free-rotating peripheral rollers which are assembled in said wheels through shafts which are equidistant to one another and equidistant and parallel to the shaft of the drive wheels.

The pallets of the band of pallets are in turn provided, on their inner surface, with engaging formations which can be coupled on the peripheral rollers of the drive wheels, for which they have configurations complementary with those of the rollers.

The band of pallets describes in the overturning section running around the drive wheels a curved trajectory such that the engaging formations of the pallets of said band follow another curved trajectory tangent to said drive wheels. The engaging formations of the pallets circulating at any given time close to this point or section of tangency are coupled on the peripheral rollers of the drive wheel, thus defining the drive or movement transmission means between the drive wheels and the band of pallets.

The shaft on which the drive wheels are assembled can be driven by a gear motor by means of a chain or another transmission system, this shaft being responsible for transmitting power to the band of pallets. The preferred system will be driven by a chain, so said chain will transmit the power from a pinion arranged in the gear to another pinion integral with the shaft of the two drive wheels. In addition to said pinion, the two drive wheels having the peripheral rollers are assembled on the mentioned shaft, one on each side of the walkway, which rollers will be responsible for transmitting the power to the band of pallets. The drive wheels will include as many peripheral rollers as possible within the diameter available and the pitch of the band of pallets, the minimum recommended number of rollers being 16.

While the drive wheels rotate, the peripheral rollers will engage the formations of the inner surface of the pallets in the overturning area of the band of pallets, transmitting the movement to them. The peripheral rollers of the drive wheels could in turn rotate freely about their shaft which moves integrally with the drive wheels.

In addition to the engaging formations described, the pallets of the band of pallets will externally have pallet rollers which will be moved by the guides of the walkway, the trajectory of the band of pallets defining the path of these pallet rollers.

According to a possible embodiment, the side guides will be movable along the overturning section surrounding the drive wheels and can be made up of respective rims integral with the drive wheels, concentric with said wheels and with the trajectory described by the pallet rollers of the pallets of the band of pallets.

In one embodiment variant, the side guides can be fixed along the overturning section surrounding the drive wheels, these guides describing a curved section which will define the trajectory of the pallet rollers of the pallets along the overturning section, which will also be tangent at its ends to the guides running along the forward movement and return sections of the band of pallets. In this embodiment, the side guides along the overturning section surrounding the drive wheels can be made up of a fixed circular curve which is attached to the sections of the guides running along the forward movement and return sections of the band of pallets.

The curved trajectory described by the band of pallets in the overturning section running around the drive wheels can be circular such that the engaging formations of the pallets of said band follow another curved trajectory with a circular outline, having a radius greater than that of said drive wheels and tangent thereto. The formations of the pallets circulating at any given time close to this point of tangency will be coupled to or will engage the peripheral rollers of the drive wheel.

The band of pallets can also described a non-circular curved trajectory in the overturning section surrounding the drive wheels, such that the engaging formations of the pallets follow a trajectory tangent to the drive wheels. Like the preceding case the engaging formations of the pallets circulating at any given time close to the mentioned point of tangency will be coupled to or will engage the peripheral rollers of the drive wheels.

According to another possible embodiment, the curved trajectory of the band of pallets in the overturning section surrounding the drive wheels can have a circular outline such that the engaging formations of the pallets follow a trajectory having the same radius as that of the drive wheels and concentric with said wheels. With this configuration, all the engaging formations of the pallets circulating at any given time through the overturning section will be coupled to or will engage the peripheral rollers of the drive wheels.

BRIEF DESCRIPTION OF THE DRAWINGS

The attached drawings show non-limiting embodiments of possible drive systems for driving the moving walkway of the invention given by way of non-limiting example. In the drawings.

DETAILED DESCRIPTION OF AN EMBODIMENT

Figure 1:
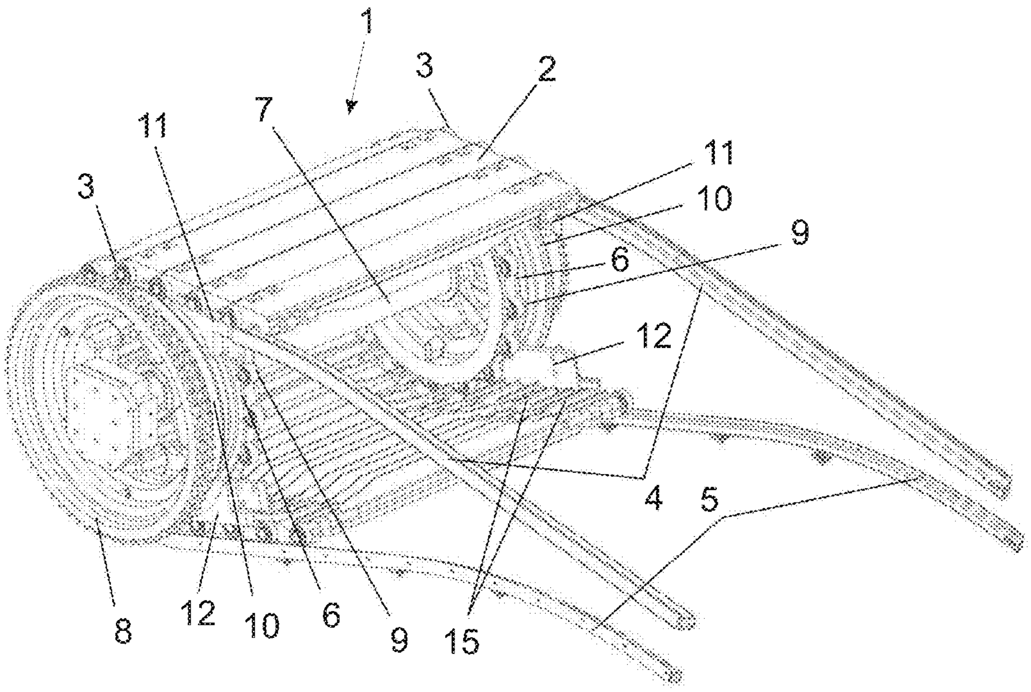
FIG. 1 is a perspective view of a complete drive system for the band of pallets of the walkway of the invention.
Figure 2:
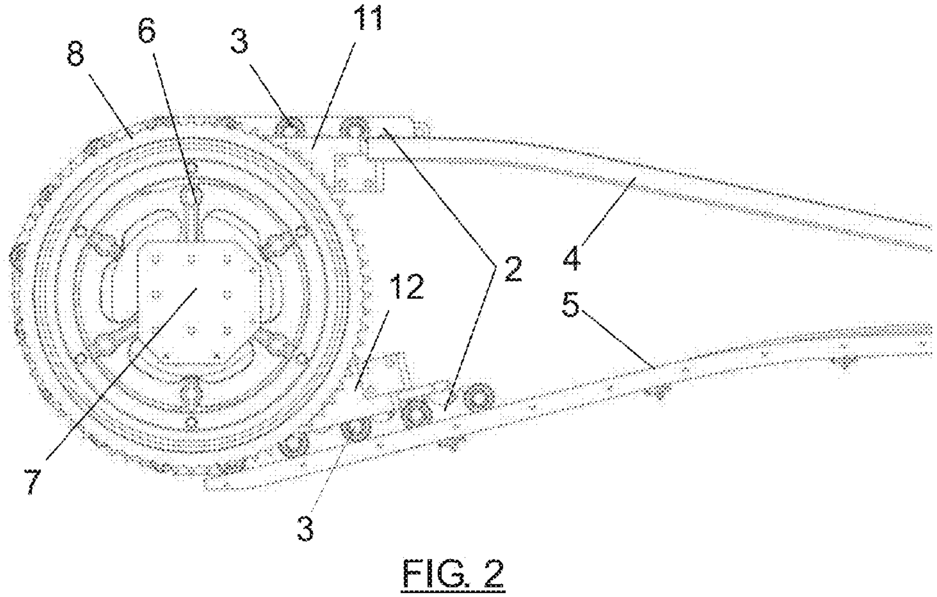
FIG. 2 is a side elevational view of the drive system of FIG. 1.
Figure 3:
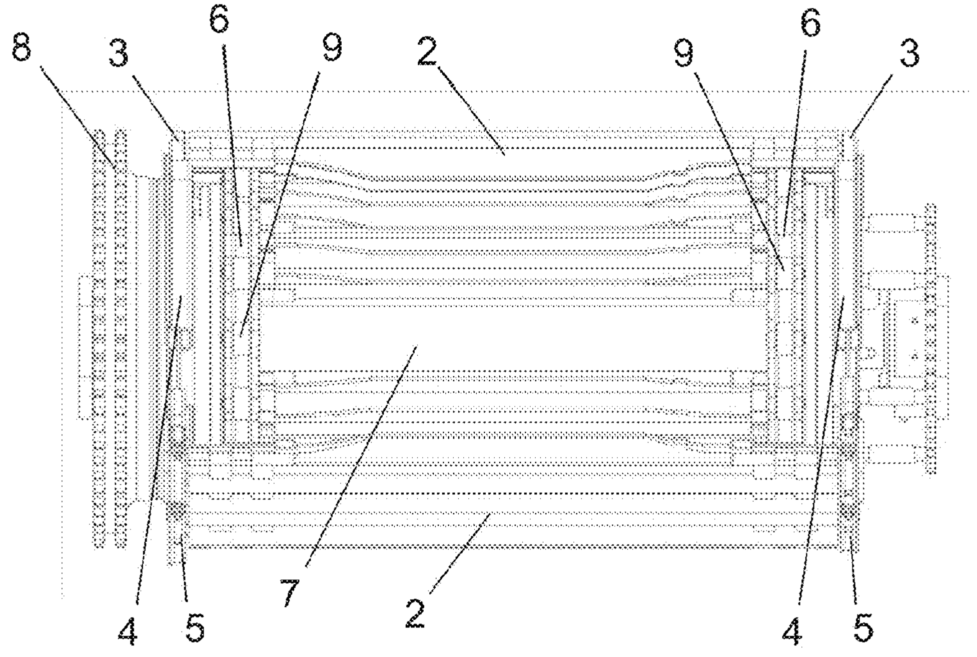
FIG. 3 is a front elevational view of the drive system of FIG. 1.

The constitution, features and advantages of the drive system of the pallets of the walkway of the invention can be better understood from the following description in relation to the embodiment shown in the drawings described above.

As shown in FIGS. 1 to 4, the moving walkway comprises a movable band 1 made up of pallets 2 having side pallet rollers 3 which can roll on guides 4 and 5 driving said pallets along the forward movement and return sections of the band of pallets. As will be explained below, these guides are completed with overturning sections for the band 1 of pallets 2.

Figure 4:
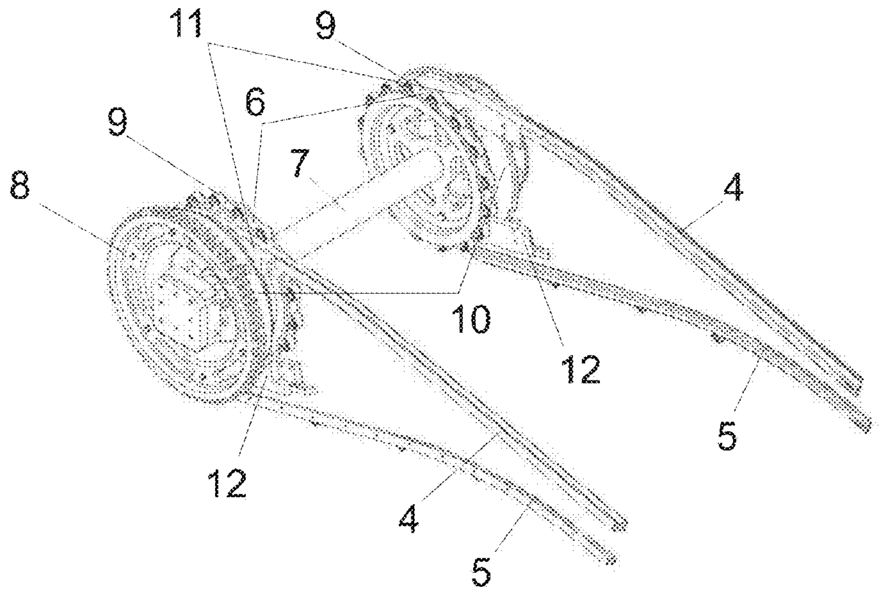
FIG. 4 is a perspective view similar to FIG. 1 in which the band of pallets has been eliminated.
Figure 5:
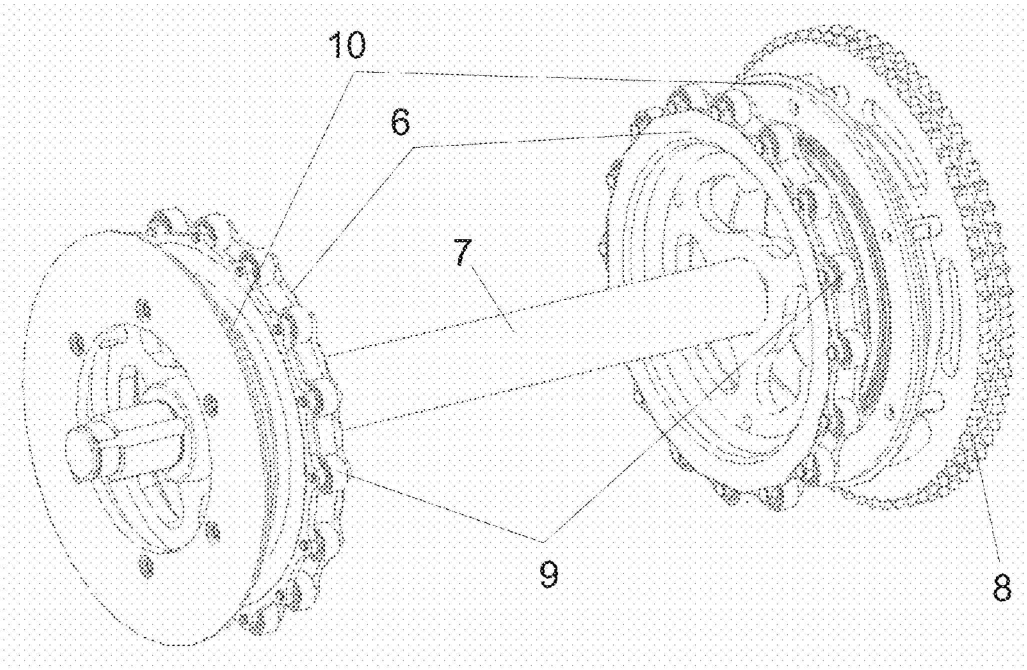
FIG. 5 is a perspective view of the assembly formed by the two drive wheels assembled on a common shaft and with the free-rotating peripheral rollers.

As can be better seen in FIGS. 4 and 5, the drive mechanism of the walkway is formed by two drive wheels 6 which are assembled on one and the same shaft 7 having a pinion 8 integral therewith obtaining power from the output shaft of a gear motor through a chain which are not depicted. The drive wheels 6 have free-rotating peripheral rollers 9 assembled on shafts which are equidistant to one another and also equidistant and parallel to the shaft 7 of the drive wheels 6.

In the embodiment shown in FIGS. 1 to 5, the guides on which the pallet rollers 3 rest along the overturning section surrounding the drive wheels 6 are made up of respective rims 10 which are integral and concentric with said wheels and with the trajectory described by the pallet rollers 3 of the pallets 2 of the band 1 of pallets. The rims 10 thus support the pallet rollers 3 of the pallets 2 of each of the sides of the band 1 of pallets. In the upwards direction, the pallet rollers 3 of the pallets 2 of each side roll on the upper guide 4 and reach the rim 10 through an upper support runner 11. In the trajectory exiting the rim 10, the pallet rollers 3 of the pallets 2 of each side exit by rolling through the lower runner 12 towards the lower roller guide 5.

Figure 6:
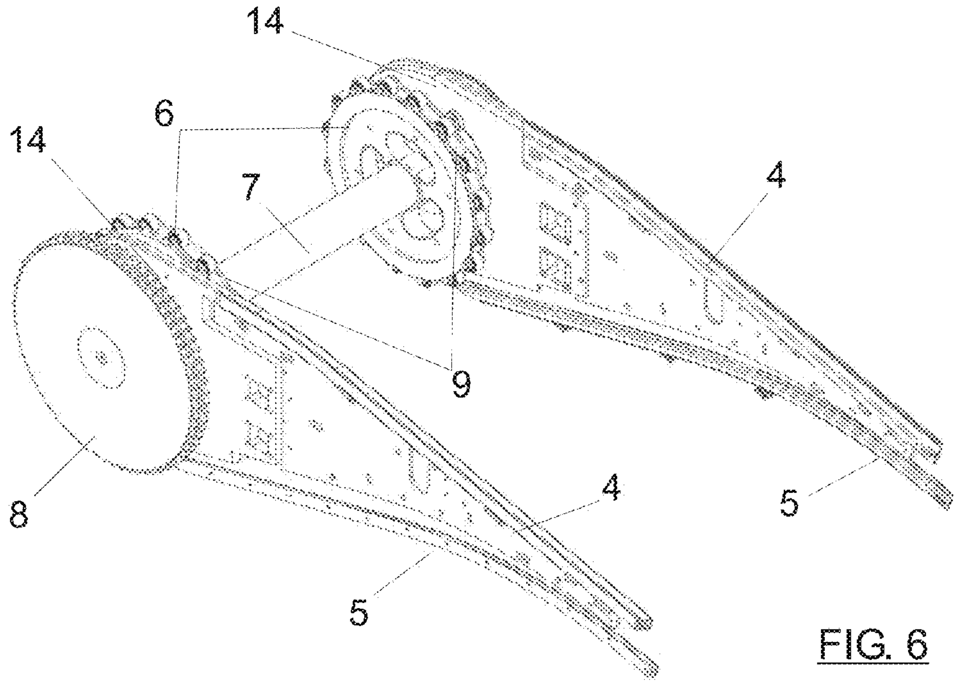
FIG. 6 is a perspective view similar to FIG. 5 showing an embodiment variant of the guides of the band of pallets in the overturning section of said band.

FIG. 6 shows an embodiment variant in which the guides for the pallet rollers 3 of the pallets 2 along the overturning section surrounding the drive wheels 6 are made up of two fixed independent parts 14 such that the pallet rollers of the pallets of each of the sides of the band 1 of pallets in the upwards direction roll on the upper roller guide 4 and reach the guides 14 from which they exit from the lower part towards the lower guides 5.

Figure 7:
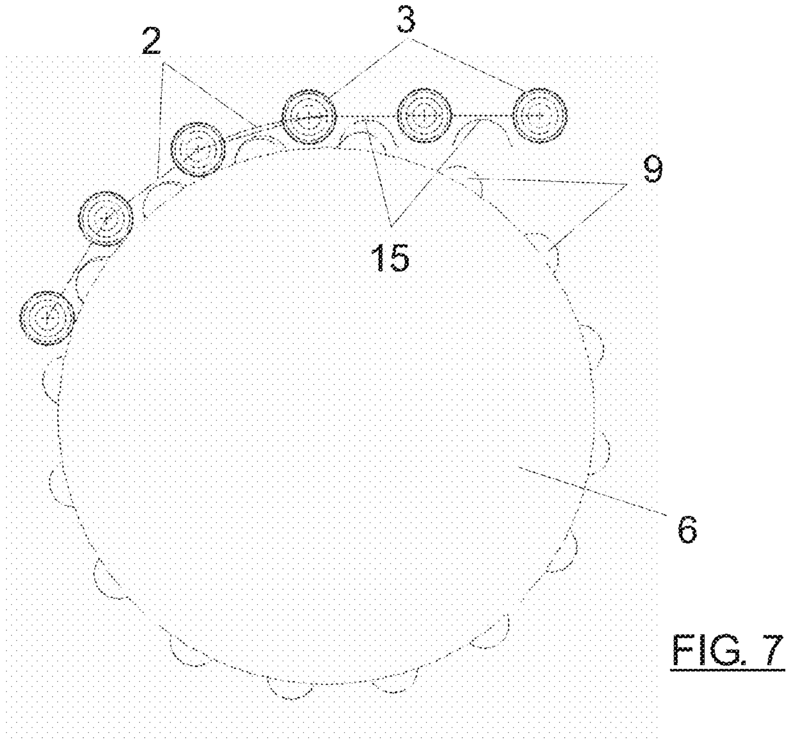
FIG. 7 is a schematic side elevational view of the engagement mechanism between the formations of the pallets and the free-rotating rollers of the drive wheels according to two concentric circular trajectories.
Figure 11:
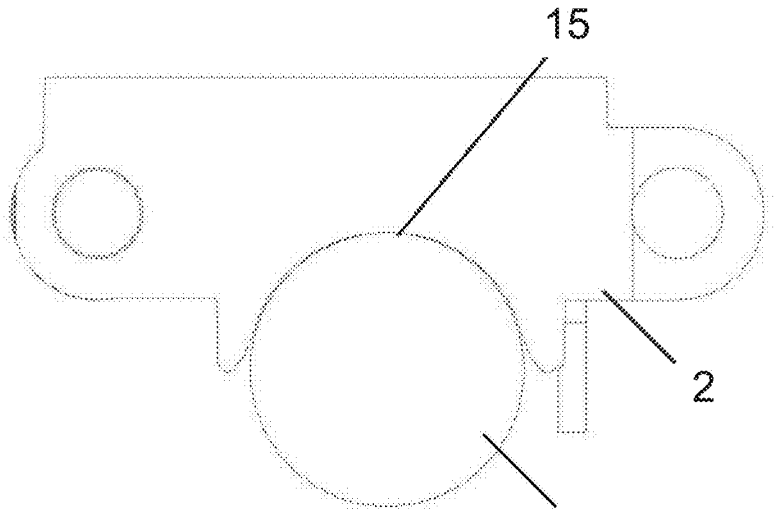
FIG. 11 is a schematic side elevational view showing the possible shape of the formations of the pallets engaging the free-rotating rollers of the drive wheels.

As can be seen in FIG. 11 each of the pallets 2 of the band 1 of pallets has in the lower part formations 15 the shape of which is complementary to that of the peripheral rollers 9 of the drive wheels. As can be seen in FIG. 7, in the overturning section of the band 1 of pallets running around the drive wheels 6, the formations 15 of at least part of the pallets 2 forming this section are coupled on the peripheral rollers 9 of the drive wheels 6. The trajectory described by the pallets in this overturning section defined by the path of the rollers 3 can have a circular outline concentric with the drive wheels 6, the drive formations 15 describing a circular trajectory having the same radius as that of said drive wheels as shown in FIG. 8, in which case all the formations 15 of the pallets 2 defining the overturning section will be coupled to or will engage the peripheral rollers 9 of the drive wheels 6.

Figure 9:
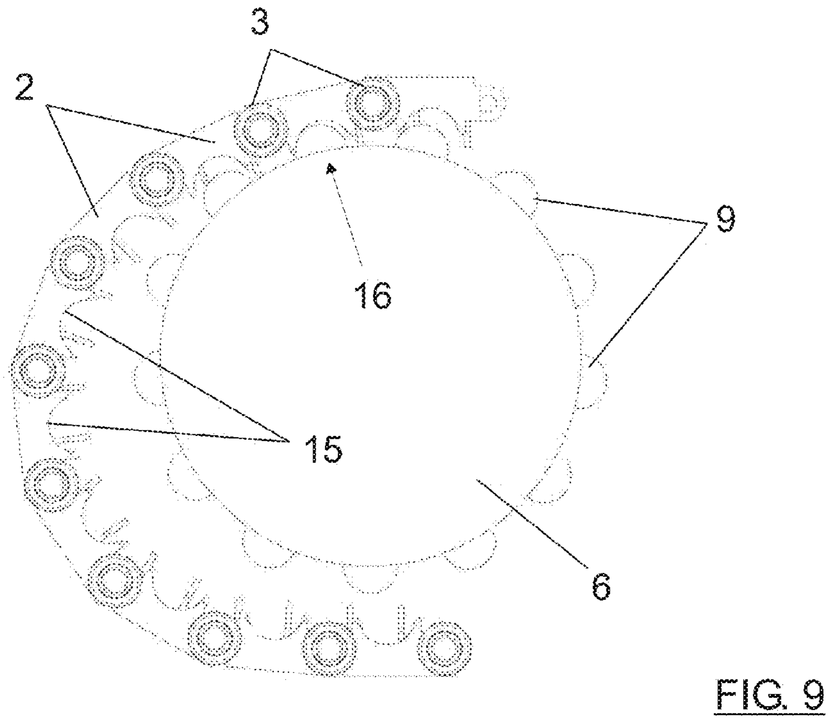
FIGS. 9 and 10 are schematic side views similar to FIG. 8 showing two embodiment variants.

The curved trajectory of the overturning section described above may not be circular and the trajectory described by the drive formations 15 can have a higher point of tangency 16 with the drive wheels 6, as depicted in FIG. 9. In this case only the formations 15 of the pallets 2 which at any given time coincide with or are close to the point of tangency 16 mentioned above will engage the peripheral rollers 9 of the drive wheels 6. This non-circular curved trajectory of the band of pallets in the overturning section will be defined by the movement of the pallet rollers 3 of the pallets on the guides which drive such rollers in the overturning section and which can be made up of fixed parts 14 of FIG. 6.

Figure 10:
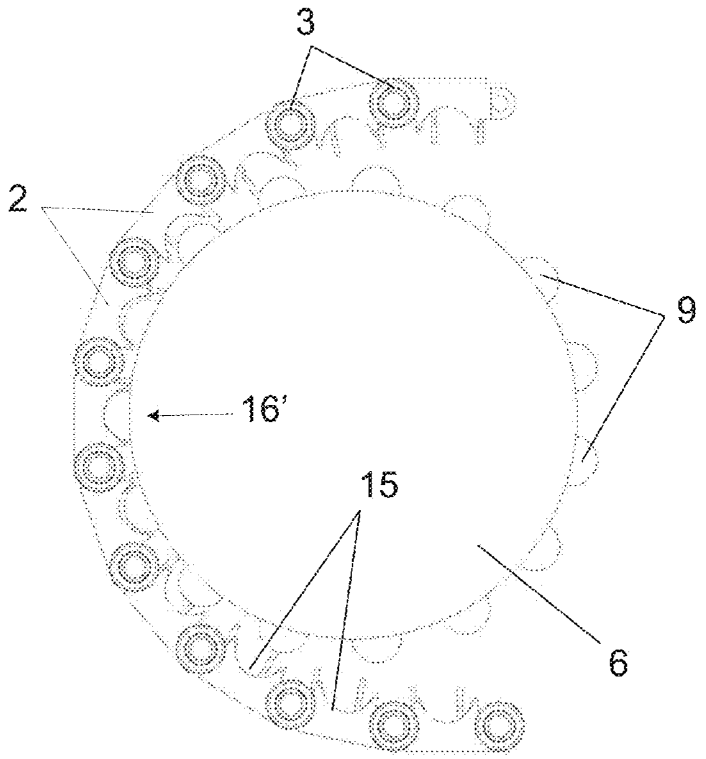

FIG. 10 shows another embodiment variant in which the guides driving the pallet rollers 3 of the pallets 2 along the overturning section surrounding the drive wheels 6 describe a circular trajectory that is not concentric with the drive wheels 6, the formations 15 of the pallets 2 describing a circular trajectory having a radius greater than that of the peripheral rollers 9 and tangent thereto at a point 16', whereby the engagement of the band of pallets and the drive wheels 6 will only occur through the pallets 2 running at any given time close to the point of tangency 16' described above.

Figure 8:
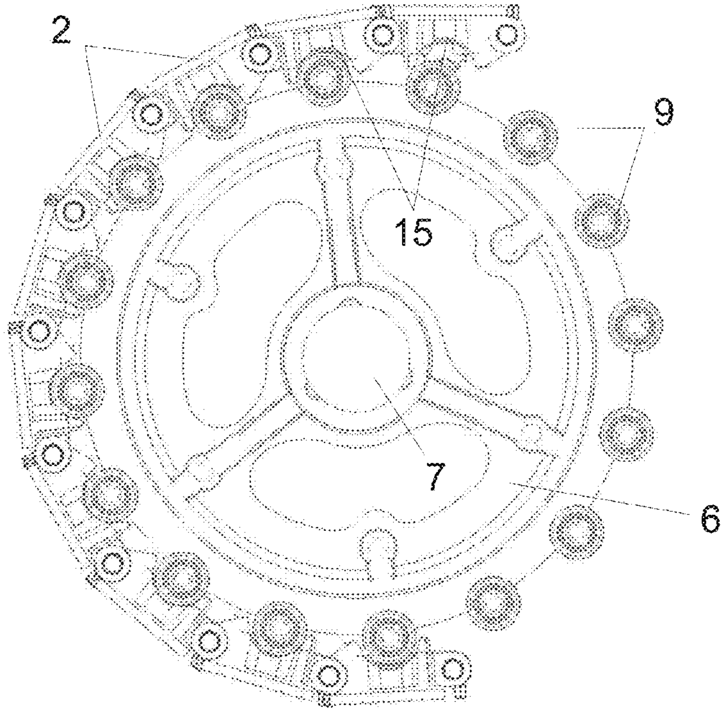
FIG. 8 is a side elevational view of the complete engagement mechanism between the formations of the pallets and the peripheral rollers of the drive wheels according to two concentric circular trajectories.

Ultimately, the engagement of the band 1 of pallets 2 and the drive wheels 6 can occur along an approximately semi-circular trajectory such as in FIG. 8, or through the series of pallets 2 circulating at any given time close to the point of tangency 16-16' of FIGS. 9 and 10.

With the described constitution, a drive system for moving walkways is obtained in which there is no chain of pallets and where less space is necessary for the drive mechanism of the walkway.

The invention claimed is:

1. A moving walkway comprising a moveable band of pallets on side guides and a drive mechanism; the pallets having pallet rollers movable on the side guides driving the band of pallets along a forward movement section, a return section and intermediate overturning sections; and the drive mechanism including at least one pair of drive wheels having a common shaft around which one of overturning sections of the band of pallets runs; wherein:

the drive wheels have free-rotating peripheral rollers which are assembled in said wheels through shafts which are equidistant and parallel to the shaft of the drive wheels;

the pallets of the band of pallets have on an inner surface engaging formations which can be coupled on peripheral rollers of the drive wheels; and the band of pallets describes in the overturning section running around the drive wheels a curved trajectory in which the engaging formations describe a trajectory which is tangent to the drive wheels at a point or section in which said formations are coupled on the peripheral rollers of the drive wheels.

2. The walkway according to claim 1, wherein the curved trajectory of the band of pallets in the overturning section is circular, concentric and has a radius greater than that of the drive wheels, and the engaging formations describe a circular trajectory tangent to said drive wheels.

3. The walkway according to claim 1, wherein the band of pallets describes in the overturning section a non-circular curved trajectory, the engaging formations running according to a trajectory tangent to the drive wheels.

4. The walkway according to claim 1, wherein the curved trajectory of the band of pallets in the overturning section is circular and the engaging formations describe a non-concentric circular trajectory having a greater radius and tangent to the of the drive wheels.

5. The walkway according to claim 1, wherein the side guides are movable along the overturning section surrounding the drive wheels and comprise respective rims integral with the drive wheels and concentric with said wheels and with the trajectory described by the pallet rollers of the pallets of the band of pallets.

6. The walkway according to claim 1, wherein the side guides are fixed along the overturning section surrounding the drive wheels and define a curved section which coincides with a curved section described by the rollers of the pallets along the overturning section and tangent at ends to the guides running along the forward and backward movement sections of the band of pallets.

* * * * *